Sept. 30, 1958  W. M. QUINT  2,854,254
STEERING COORDINATION MEANS
Filed Oct. 5, 1955  2 Sheets-Sheet 1
Fig. 1
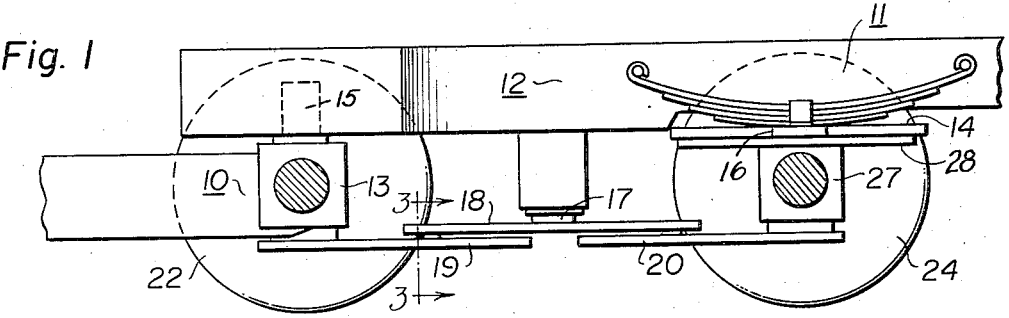
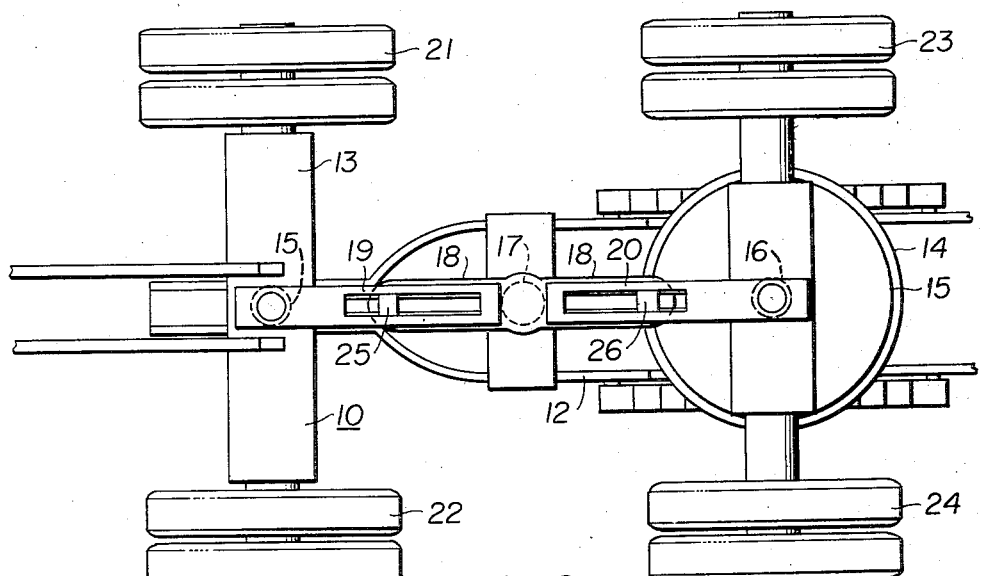
Fig. 2
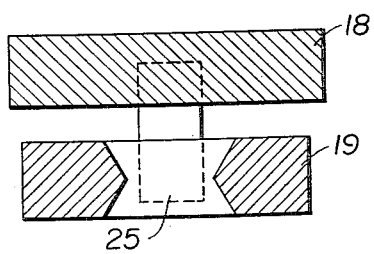
Fig. 3
INVENTOR.
WILLIAM M. QUINT
BY Pyle & Fisher
ATTORNEYS United States Patent Office 2,854,254
Patented Sept. 30, 1958

2,854,254

STEERING COORDINATION MEANS

William M. Quint, Kent, Ohio

Application October 5, 1955, Serial No. 538,628

4 Claims. (Cl. 280—442)

This invention relates in general to steering arrangements for wheeled frame structures, more generally referred to as trucks, and relates more specifically to an arrangement for guiding a trailing wheeled frame in response to and in relation to a lead wheeled frame.

An object of this invention is to guide a trailing truck in response to and in relation to a leading truck.

Another object of this invention is to prevent sliding of trailer wheels around turns.

Still another object of this invention is to reduce the power requirement to pull a loaded trailer, particularly around curves.

Yet another object of this invention is to reduce the space needed for turning a trailer.

And another object of this invention is to permit greater wheel spacing and hence greater legal load carrying capacity.

Other objects and a fuller understanding of the invention may be had by referring to the following specification and claims, taken in conjunction with the accompanying drawings, in which:

Figure 1 is a schematic side view illustration of a lead and a trailing wheeled frame or truck coupled and guided according to the principles of this invention;

Figure 2 is a bottom view of the construction of Figure 1;

Figure 3 is a section taken along line 3—3 of Figure 1;

Figure 4:
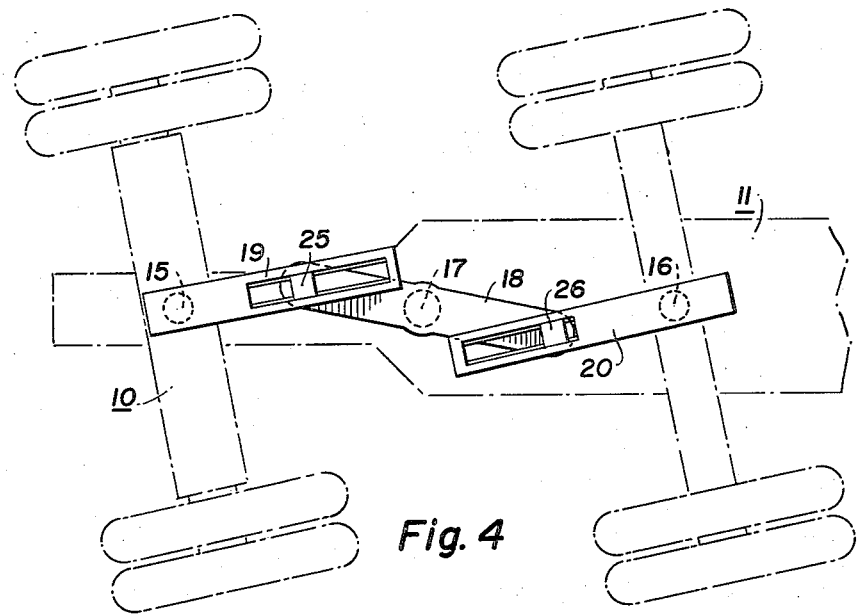
Figure 4 is a schematic illustration of the guiding mechanism with the mechanism actuated for a guided left turn.

In the present invention, the construction and operation is understandable almost at a glance at the illustrative drawings. The device is substantially free from operative failures, and is therefore safe and trustworthy. Maintenance is so slight that it may be regarded as nonexistant.

Prior devices have been complicated and elaborate to such an extent that they are unacceptable. Trucking rigs are subject to extreme use conditions. Any acceptable steering device must not reduce safety factors, increase maintenance costs, or require special, expensive construction. The present invention has none of these objectionable features, but rather is rugged and simple. Its utter simplicity gives a first impression of oversimplification. The fact, however, is that this invention provides all the desired and necessary functions together with unfailing dependability.

The drawing sets forth the principles of the invention by schematic illustration, and a specific construction or application is not intended. In the drawing the reference character 10 indicates a lead truck. The word "truck" is taken in the broad sense of a wheeled frame device and not a motor vehicle. Truck 10 comprises generally an axle frame 13 with wheels 21 and 22 thereon. In most applications to which the present invention will apply, the lead truck 10 will actually be the driving power wheels of a tractor. Nevertheless, it is understood that the lead truck 10 may be any wheeled frame device.

A trailing truck 11 which will generally be the front truck of a four-wheeled semi-trailer, is supported through a fifth wheel arrangement and is provided with road wheels 23 and 24. The fifth wheel arrangement consists of an upper plate 14 and a lower plate 28. Plate 14 is secured to the supporting spring of the trailer and plate 28 is connected to an axle structure 27 carrying the wheel assembly 23 and 24. The plates 14 and 28 are pivotally joined at their center and thus provide freedom for the axle 27 to pivot while resiliently connected to the trailer frame and support of the frame.

A conventional fixed axle is carried at the back end of the semi-trailer. Such rear fixed axle is not illustrated in the drawing for the reason that it is not necessary to the understanding of the guiding relationship between the guided trailer wheels 23 and 24 and the guiding truck 10 with its wheels 21 and 22.

The purpose of this invention is not necessarily to provide tracking of the trailing truck 11 in the tracks of the lead truck 10, but rather to establish a coordinated guiding relationship which prevents side drag of the trailing vehicle while negotiating turns, although the guided front wheels of course can be employed to aid in negotiating shorter turns and in backing. Such guiding coordination as provided by this invention enables a much greater longitudinal spacing of trailer wheels, for example, and thus makes possible the carrying of greater pay loads because of the state laws which define the permissible load in terms of axle spacing.

Small semi-trailers have only one rear truck. However, larger semi-trailers have dual rear trucks and often have a forward truck. If the forward truck is fixed, the spacing distance is limited because of side drag when turning. Legal loading limits are sometimes related to spacing between such trucks. Further, better load distribution is obtainable with greater spacing. Therefore, good and reliable steering of such forward wheels is desirable. This invention provides such acceptable and reliable steering.

In order to properly provide the coordinated steering relationship, means is provided which establishes three pivot points in longitudinal alignment. In the illustration set forth in the drawing, a trailer bed 12 is employed to establish such relationship. Bed 12 has a pivot point 15 about which the truck 10 is pivotable. In this instance, pivot point 15 is the fifth wheel connection to a pulling tractor. A pivot 16 is provided for the trailing truck 11. Intermediate the pivots 15 and 16 is a center pivot 17.

Although the preferred embodiment in actual construction may take various forms according to conditions to be met, the preferred embodiment for the purpose of illustrating the invention and for the bulk of the actual tractor-trailer installations will take the form of a track 19, such as that extending rearwardly from the truck 10. Track 19 is provided with a longitudinally reciprocable pivot block 25. The track 19 and the path of reciprocation of the pivot block 25 is preferably in a direction normal, or at right angles, to the axis established by the wheels 21 and 22.

A similar track 20 having a pivot block 26 is carried by and extends forward from the trailing truck 11. A transposition bar 18 is then pivoted at the pivot 17. The bar 18 has a forward and a rear pivot end extending into the pivot blocks 25 and 26 respectively. Therefore, identical pivotal swinging in opposite directions will be established between the tracks 19 and 20 because of the coordinating pivoted relationship therebetween necessitated by the pivoted bar 18.

As thus described, it will be seen that a lead and trailing wheeled frame device has been shown with a means establishing a first, second, and third pivot point in longitudinal alignment. The lead wheeled frame device is pivoted at the first pivot point. The trailing wheeled frame device is pivoted at the third pivot point. Means is then provided to establish a slidable pivot having a reciprocable path extending from the lead wheeled frame device toward the second pivot point and a similar means is provided which establishes a slidable pivot having a reciprocable path extending from the trailing wheeled frame device toward the second pivot point. A transposition bar having a first and second end is carried in the slidable pivot of the lead and trailing wheeled frame devices respectively, and a pivot between the first and second ends of the bar is carried at the second, or center, pivot point to establish guiding coordination.

The driving coordination may be established by many actual physical embodiments, any one of which may be most suited for a particular need. The illustrated embodiment, however, is quite satisfactory and need not be protected from the elements unless some severe and unusual condition is encountered. The construction and actual operation is quite rugged and large, and the forces upon the slidable pivot blocks 25 and 26 are so great that they will expel accumulation of crust material even when frozen. Reasonable attention to supply a coarse, tough grease will keep the pivot blocks 25 and 26 in working order over long periods of time. Replacement when worn beyond servicable condition is rapid and inexpensive. Considerable wear may be tolerated without diminution of function before replacement is required.

Figure 5:
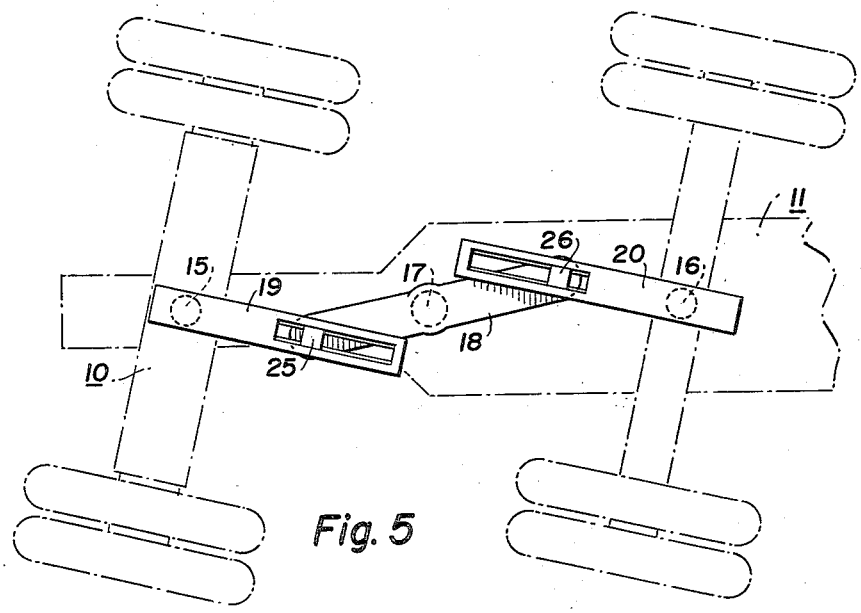
Figure 5 is a schematic illustration of the guiding mechanism with the mechanism actuated for a guided right turn.

In Figures 4 and 5 of the drawings, the various positions of the guiding apparatus has been set forth together with dotted general outlines indicating position of the leading and trailing trucks in order to aid in visualizing the turning coordination and to emphasize the fact that exact tracking of the trailer with respect to the lead truck is not intended or necessarily desired. Nevertheless, it may readily be seen that the path of longitudinal reciprocation for the pivot blocks as established by the tracks will remain always parallel with respect to one another regardless of the direction of travel. In view of the fact that the lead vehicle will always be supplied with some guiding apparatus, the driving force will always occur from the lead to the trailing vehicle, and accordingly no reverse guiding action of sufficient force to deflect the lead vehicle from its intended direction is ever encountered.

Although the invention has been described in its preferred form with a certain degree of particularity, it is understood that the present disclosure of the preferred form is made only by way of example and that numerous changes in the details of construction and the combination and arrangement of parts may be resorted to without departing from the spirit and the scope of the invention as hereinafter claimed.

I claim:

1. A lead and a trailing wheeled frame device, means establishing a first, second and third pivot point in longitudinal alignment, said lead wheeled frame device pivoted at said first point, said trailing wheeled frame device pivoted at said third pivot point, means establishing a slidable pivot having a reciprocable path extending from the lead wheeled frame device toward said second pivot point, means establishing a slidable pivot having a reciprocable path extending from the trailing wheeled frame device toward said second pivot point, a transposition bar having a first and second end carried in said slidable pivot of the lead and trailing wheeled frame devices respectively, and a pivot carried by the trailing wheeled frame device between the first and second ends of the bar, said pivot carried at said second pivot point.

2. In a mobile vehicle having a lead vehicle with rear wheeled supports and a trailing vehicle with front wheeled support, the provision of a guiding device to direct the path of the trailing vehicle, comprising, a pivotal mount for said front wheeled support to provide rotary movement thereof with respect to the trailing vehicle, a first track extending rearwardly of the said rear wheeled support at a right angle to an axis of the wheels thereof, a second track extending forward of the said front wheeled support at a right angle to an axis of the wheels thereof, and link means pivotally carried by the trailing vehicle interconnecting said first and second tracks, said link means transferring guide drive force from said first to said second track and transposing the driving force to cause the said first and second tracks to move in parallelism and in opposed directions.

3. A steering device for the lead wheels of a multi-axle semi-trailer vehicle, comprising, a semi-trailer body, a front end bearing fifth wheel and a plurality of axles supporting said semi-trailer body for mobility, one of said axles being a lead axle, pivotal means mounting said semi-trailer upon said lead axle, a pulling vehicle, said pulling vehicle having a rear axle, said semi-trailer fifth wheel pivotably carried by said pulling vehicle, a first rigid track extending from the pivotal axle of the semi-trailer toward said pulling vehicle, a second rigid track extending from said rear axle of the pulling vehicle toward said semi-trailer, a control bar having a first end slidably interconnected to said first track for longitudinal movement only therealong and a second end similarly interconnected to said second track, and a pivot intermediate the first and second ends of said control bar, said pivot carried by said semi-trailer body.

4. A coordinated steering apparatus for a semi-trailer coupled to a tractor, comprising, a semi-trailer frame, said frame having a forward and a rearward end, a fixed axle at the rearward end of said frame, a pivot bearing at the forward end of said frame, a pivoted axle between said forward and rearward ends, said pivot bearing being a first pivot point, said pivoted axle being a third pivot point, a second pivot at a point between said first and third pivot points, a tractor rear axle pivotally supporting said first pivot point, a transposition bar having a first and second end with a pivot between said ends, said pivot of the bar attached to said frame at said second pivot point, and said trailer pivotal axle having a track extending in the direction of said second pivot point, said tractor axle having a track extending in the direction of said second pivot point, said tracks each extending at right angles to the axis of the respective trailer and tractor axles, said first and second ends of said transposition bar slidably carried by said tracks of the tractor axle and trailer axle respectively.

References Cited in the file of this patent

UNITED STATES PATENTS

| | | |
|---|---|---|
| 591,197 | Rogers | Oct. 5, 1897 |
| 613,141 | Habhegger | Oct. 25, 1898 |
| 1,091,516 | Johnson | Mar. 31, 1914 |
| 1,999,665 | Schroeder | Apr. 30, 1935 |

FOREIGN PATENTS

| | | |
|---|---|---|
| 463,107 | Germany | July 23, 1928 |